US 11,644,574 B2

(12) United States Patent
Westerhoff et al.

(10) Patent No.: US 11,644,574 B2
(45) Date of Patent: May 9, 2023

(54) METHOD FOR ESTIMATING HEIGHT OF OBJECT (71) Applicant: Aptiv Technologies Limited, St. Michael (BB)

(72) Inventors: Jens Westerhoff, Bochum (DE); Wolfgang Doerr, Wiehl (DE)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/807,547

(22) Filed: Jun. 17, 2022

(65) Prior Publication Data

US 2022/0404493 A1    Dec. 22, 2022

(30) Foreign Application Priority Data

Jun. 18, 2021  (EP) ..................................... 21180199

(51) Int. Cl.
  *G01S 17/36*    (2006.01)
  *G01S 17/931*   (2020.01)
(52) U.S. Cl.
  CPC ............ *G01S 17/36* (2013.01); *G01S 17/931* (2020.01)
(58) Field of Classification Search
  CPC ............................... G01S 17/36; G01S 17/931
  USPC ......................................................... 356/5.01
  See application file for complete search history.

(56) References Cited

U.S. PATENT DOCUMENTS

2013/0038484 A1   2/2013  Ohkado et al.
2014/0292559 A1   10/2014 Asanuma et al.

FOREIGN PATENT DOCUMENTS

| CN | 106772309  | 5/2017 |
| CN | 108007401  | 5/2018 |
| CN | 112462367  | 3/2021 |
| DE | 19801617   | 7/1999 |
| JP | 6858067    | 4/2021 |
| WO | 2018154066 | 8/2018 |

OTHER PUBLICATIONS

"Extended European Search Report", EP Application No. 21180199. 8, dated Dec. 6, 2021, 10 pages.
Brisken, et al., "Elevation Estimation with a High Resolution Automotive Radar", 2019 IEEE Radar Conterence (RadarConf), Boston, MA, USA, doi: 10.1109/RADAR.2019.8835831, Apr. 2019, 5 pages.

(Continued)

*Primary Examiner* — Daniel L Murphy
(74) *Attorney, Agent, or Firm* — Colby Nipper PLLC (57) ABSTRACT The present disclosure describes systems and techniques for estimating a height of an object by processing wave signals transmitted from a detection device to the object and reflected by the object. In aspects, a detection device transmits wave signals, which propagate via a direct path and an indirect path via reflection over a reflecting surface, to be reflected by the object. Operations include measuring wave signals reflected by the object and generating measurement vectors and producing a spectrum of an estimated elevation angle of the object over the range. Further, the operations include estimating the height of the object from the spectrum. The length of the window can be determined by estimating the range interval covered by a full phase cycle of a phase difference between the direct path and the indirect path from a current value of the range and a current estimate of the height of the object.

9 Claims, 4 Drawing Sheets (56) References Cited

OTHER PUBLICATIONS

Diewald, et al., "Radar-interference-based bridge identification for collision avoidance systems", 2011 IEEE Intelligent Vehicles Symposium (IV), Baden-Baden, Germany, doi: 10.1109/IVS.2011.5940422, Jun. 2011, pp. 113-118.

Laribi, et al., "A Machine Learning Approach for Radar Based Height Estimation", 2018 21st International Conference on Intelligent Transportation Systems (ITSC), Maui, HI, USA, doi: 10.1109/ITSC.2018.8569923., Nov. 2018, pp. 2364-2370.

Laribi, et al., "A performance comparison of RELAX and MODE for multipath height finding", 2017 18th International Radar Symposium (IRS), Prague, Czech Republic, doi: 10.23919/IRS.2017.8008122., Jun. 2017, 10 pages.

Laribi, et al., "Vertical Doppler beam sharpening goes self parking", 2018 IEEE Radar Conference (RadarConf18), Oklahoma City, OK, USA, Apr. 2018, 6 pages.

METHOD FOR ESTIMATING HEIGHT OF OBJECT

INCORPORATION BY REFERENCE

This application claims priority to European Patent Application Number EP21180199.8, filed Jun. 18, 2021, the disclosure of which is incorporated by reference in its entirety.

BACKGROUND

In the automotive field, radar devices are used for providing reliable and accurate information on the driving environment for Advanced Driver Assistance Systems, even in bad weather and poor lighting conditions. They are considered as key technology for automotive safety systems and highly automated driving systems. Radar devices can provide measurements of an object distance (for example: distance between the radar device and an object), and relative velocity of an object. They can also be used to estimate the height of an object with respect to the road surface (for example: the height of a target). For autonomous driving, critical objects to measure are not only big objects like trucks or high-speed vehicles, but also stationary objects. In case of a stationary object, it is needed to determine whether or not the vehicle can drive over or under the object. Therefore, a main challenge is to estimate height information of the object.

The estimation of target heights based on instantaneous radar data is difficult due to the fact that the radar device operates in a multipath environment, as explained below.

The road surface is a good reflecting surface for radar waves. As a result, there are two propagation paths between the radar device and the object in each of the two propagation directions: a direct propagation path and an indirect propagation path via the road surface. The two propagation paths are taken by the radar waves transmitted from the radar device to the object and by the radar waves reflected by the object towards the radar device. Due to the reflection on the road surface, it is as if the radar device sees two objects: the real object and an artificial object corresponding to the mirror image of the object below the road surface. It is known that the two objects, real and artificial, cause an interference phenomenon which results in disturbances in the radar signals received by the receiving antenna element(s), such as peaks and/or valleys in the course of intensity modulation of the received radar signals over the range (for example: over the distance between the radar device and the object or target). In other words, when the distance between the radar device and the object varies, the intensity of the reflected radar signals received by the radar device varies and shows peaks and/or valleys at specific values of the range due to the interference phenomenon.

Many approaches have been proposed to estimate a target height in a multipath environment. The following references describe different approaches:

[1] A. Laribi, M. Hahn, J. Dickmann and C. Waldschmidt, "A performance comparison of RELAX and MODE for multipath height finding," 2017 18th International Radar Symposium (IRS), Prague, Czech Republic, 2017, pp. 1-10, doi: 10.23919/IRS.2017.8008122.

[2] A. Laribi, M. Hahn, J. Dickmann and C. Waldschmidt, "Vertical Doppler beam sharpening goes self-parking," 2018 IEEE Radar Conference (RadarConf18), Oklahoma City, Okla., USA, 2018.

[3] S. Brisken, J. Gütlein-Holzer and F. Höhne, "Elevation Estimation with a High Resolution Automotive Radar," 2019 IEEE Radar Conference (RadarConf), Boston, Mass., USA, 2019, pp. 1-5, doi: 10.1109/RADAR.2019.8835831.

[4] A. Laribi, M. Hahn, J. Dickmann and C. Waldschmidt, "A Machine Learning Approach for Radar Based Height Estimation," 2018 21st International Conference on Intelligent Transportation Systems (ITSC), Maui, Hi., USA, 2018, pp. 2364-2370, doi: 10.1109/ITSC.2018.8569923.

[5] F. Diewald, J. Klappstein, F. Sarholz, J. Dickmann and K. Dietmayer, "Radar-interference-based bridge identification for collision avoidance systems," 2011 IEEE Intelligent Vehicles Symposium (IV), Baden-Baden, Germany, 2011, pp. 113-118, doi: 10.1109/IVS.2011.5940422.

[6] DE19801617A1, "Motor vehicle radar signal processing method for estimating height of object on reflecting surface".

The references [1], [2] and [3] respectively propose a range resolution, an angle resolution and a multi-dimension resolution (including range, Doppler and angle resolution) of the multipath peaks. However, such approaches do not allow to satisfy the performance requirements for autonomous driving.

The reference [4] proposes a new radar-based height estimation approach using machine learning.

The references [5] and [6] disclose to use measurements while approaching a stationary obstacle such as a bridge to identify the obstacle by evaluating the intensity modulation of the received signal while a distance between the object and the radar device is changing over time.

The present disclosure proposes a new approach for estimating an object height that better uses the available information about the object and allows to quickly and adaptively estimate the height of the object.

SUMMARY

The present disclosure relates to methods for estimating the height of an object by processing wave signals transmitted from a detection device to the object and reflected by the object, in the context of multipath propagation of the waves through reflection by reflecting surface(s). In aspects, a method can be used for example in a vehicle having a radar device to estimate the height of an object above the road surface. In aspects, a method is not limited to a multipath situation caused by reflection on a road, but can be applied to other multipath situations, caused for example by reflection on a side wall or by a guard-rail. The multipath propagation can be vertical (for example when caused by a road surface) or horizontal (for example when caused by a side wall or a guard rail).

Further, the present disclosure concerns a method for estimating a height of an object, carried out by a detection device that transmits wave signals to be reflected by the object and receives wave signals reflected by the object, the wave signals propagating via a direct path between the object and the detection device and an indirect path between the object and the detection device via reflection over a reflecting surface, said method including the steps of: measuring reflected wave signals received by the detection device and generating a measurement vector of complex values, at successive measurement points in time; while a range between the detection device and the object varies, producing a spectrum of an estimated elevation angle of the object over the range by combining a plurality of measurement vectors over a sliding range window; and estimating the height of the object from the spectrum of the estimated elevation angle; wherein, the length of the sliding range window is variable and determined by estimating the range interval covered by a full phase cycle of a phase difference between the direct path and the indirect path, from a current value of the range and a current estimate of the height of the object.

In an implementation, the steps of determining the window length, producing the spectrum of the elevation angle, and estimating the height of the object are performed iteratively at successive points in time.

The above defined method allows to eliminate the interference effects and generate a spectrum of estimated elevation angle that matches the theoretical course of the elevation angle over the range in a way as no interference between the direct and indirect path would be present. This effect is achieved by the use of a sliding window whose length is variable and adaptive, to combine the measurements performed within the window. The window length depends on the current range and the current estimate of the object height. It is updated continuously while the range is varying and, at the same time, the estimate of the object height is updated and improved. This allows to quickly determine an accurate estimate of the object height by an iterative process.

In an implementation, the successive points in time correspond to successive measurement points in time. In this way, the window length is adapted and the estimated object height is updated and improved at each measurement of the detection device.

In an implementation, the variable window length $\omega_n$ at a point $t_n$ in time is computed using the expression:

$$w_n = \frac{R^2(t_n) * \lambda}{2h_{2,n} * h_1 - R(t_n) * \lambda}$$

where
$\omega_n$ is the current window length at point $t_n$ in time;
$R(t_n)$ is the range at point $t_n$ in time;
$\lambda$ is the wavelength;
$h_{2,n}$ is the current estimate of the height of the object at point $t_n$ in time;
$h_1$ is the height of the detection device.

In an implementation, the height of the object is updated using the expression:

$$h_{2,n+1} = \sin \theta(R(t_n)) * R(t_n) + h_1$$

where
$h_{2,n+1}$ is the updated value of the height of the object (2);
$R(t_n)$ is the range at point $t_n$ in time;
$h_1$ is the height of the detection device (1);
$\theta(R(t_n))$ is an estimated elevation angle derived from the spectrum of elevation angle for the range $R(t_n)$.

The elevation angle can be derived from the spectrum of estimated elevation angle by performing a peak search to determine the estimated elevation angle having the highest energy value in the spectrum for the current range.

In implementations, the method further comprises an initial step of setting either an initial height of the object or an initial window length.

In an implementation, the transmitter element transmits radar wave signals to be reflected by the object.

The spectrum of estimated elevation angle can be produced while the range between the detection device and the object is decreasing.

The present disclosure concerns a detection device including a transmitting part for transmitting wave signals to be reflected by an object; a receiving part for receiving wave signals reflected by the object, the wave signals propagating via a direct path between the object and the detection device and an indirect path between the object and the detection device via reflection over a reflecting surface; and a processor for controlling the execution of the steps of the method previously defined.

The present disclosure also concerns: a computer program including instructions to cause the detection device as above defined to execute the steps of the method previously defined; a computer-readable medium having stored thereon the computer program; and a vehicle including the detection device previously defined. In implementations, the vehicle can include a detection device that is a radar device.

BRIEF DESCRIPTION OF THE DRAWINGS

Other features, purposes and advantages of the disclosure will become more explicit by means of reading the detailed statement of the non-restrictive implementations made with reference to the accompanying drawings.

DETAILED DESCRIPTION

The present disclosure concerns the estimation of a height of a target 2 above a reflecting surface 3 by a detection device 1 that transmits waves to the target 2 and, in return, receives waves reflected by the target 2. The target 2 can be any object or element above the reflecting surface 3, for example a ground or road surface. In an implementation, the detection device 1 is a radar device that transmits and receives radar waves. The detection device 1 can be provided in a vehicle equipped with advanced driver assistance systems and/or an autonomous driving system.

Figure 5:
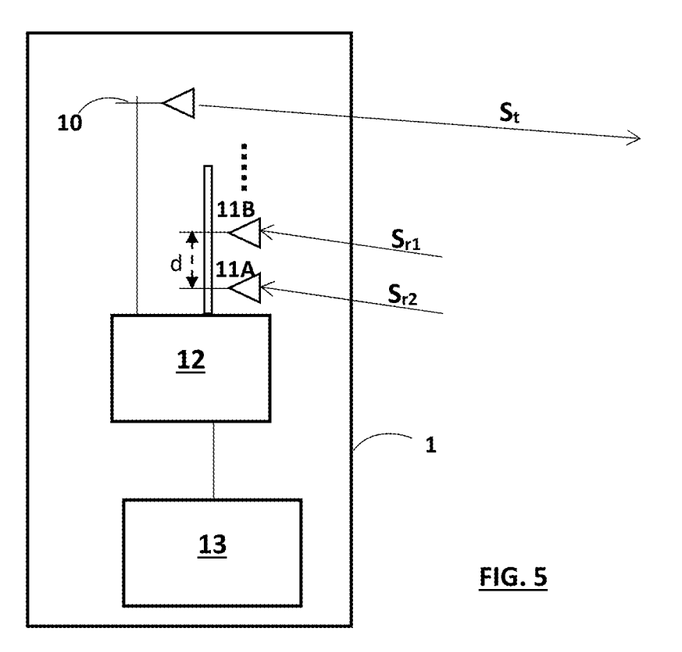
FIG. 5 shows a functional block diagram of the detection device, according to an implementation.

The detection device 1 has a transmitting part for transmitting waves and a receiving part for receiving waves. The transmitting part can have one transmitter element or a plurality of transmitter elements (two or more). The receiving part can have one receiver element or a plurality of receiver elements. Typically, the one or more transmitter elements are transmitting antenna elements and the one or more receiver elements are receiving antenna elements. In an illustrative and non-limitative implementation, as shown in FIG. 5, the transmitting part has one transmitter element 10 and the receiving part has a plurality of vertically distributed receiver elements (only two receiver elements 11A, 11B are represented, but the receiving part can include more than two receiver elements). The receiver elements 11A, 11B, . . . are separated from each other by a given spacing d. The detection device could also have one or more antenna element for both transmitting and receiving waves.

Figure 1:
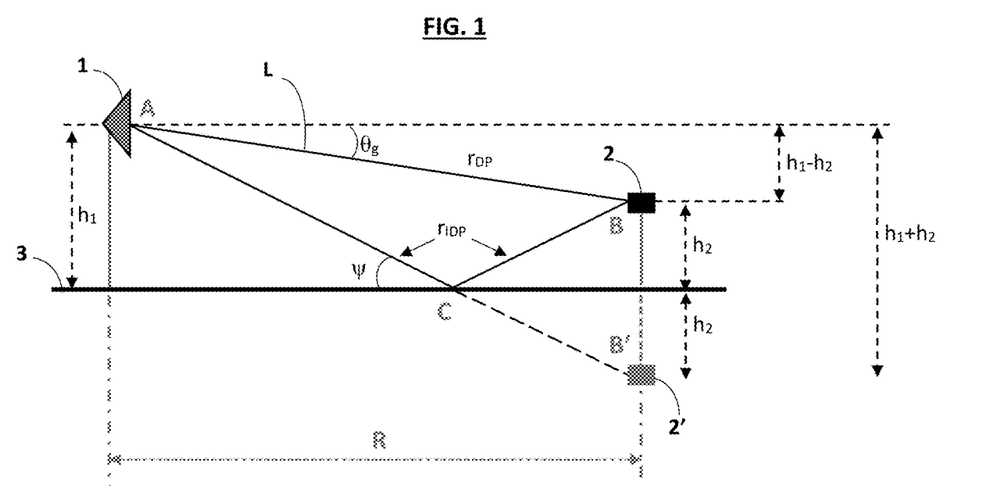
FIG. 1 shows a system including a detection device, an object and direct and indirect paths taken by waves transmitted by the detection device to the object and reflected by the object.

As shown in FIG. 1, there are multiple propagation paths between the detection device in point A and the object (or target) 2 in point B: a direct propagation path $r_{DP}$ and an indirect propagation path $r_{IDP}$ via the reflecting surface 3 in point C. The two propagation paths $r_{DP}$ and $r_{IDP}$ are taken by the waves in the two directions: from the detection device 1 to the object 2 and from the object 2 to the detection device 1. For the detection device 1, it is as if it sees two objects: the real object 2 in point B above the reflecting surface 3 and an artificial object 2' in point B' corresponding to the mirror image of the object 2 below the reflecting surface 3. As well known by the person skilled in the art, the two objects 2, 2' (real and artificial) cause interference effects in the signals received by the receiver elements 11A, 11B, . . . .

The present detection device 1 eliminates the interference effects to estimate the object height from a spectrum of elevation angle of the object 2 over the range (i.e., over the object distance that is the distance between the detection device 1 and the object 2), as explained later.

As shown in FIG. 1, a geometrical elevation angle $\theta_g$ is formed between a horizontal plane including the detection device 1 (for example: extending through the detection device 1, as shown in FIG. 1) and a line L going from the detection device 1 to the object 2. More precisely, the line L goes from the detection device 1 to the top or the bottom of the object, above the road surface, depending on the type of the object, as shown in FIG. 1. The geometrical angle of elevation $\theta_g$ of an object 2 is considered the same for the different receiver antenna elements 11A, 11B, . . . as the distance d between the receiver antenna elements 11A, 11B, . . . is very small (negligible) compared to the object distance range (R). The height of the object 2 can be derived from the elevation angle of the object, on the basis of a geometrical relationship.

As well known by the person skilled in the art, an estimate ($\theta$) of the elevation angle $\theta_g$ can be derived from measurements of the reflected wave signals received by the plurality of receiver elements 11A, 11B, . . . .

In the present disclosure, a spectrum of the estimated elevation angle $\theta$ over the range R (distance between the detection device 1 and the target 2) is generated from measurement information at the output of the receiving antenna elements 11A, 11B, . . . . More precisely, the spectrum of elevation angle $\theta$ is generated by accumulating the measurement information from the receiving antenna elements 11A, 11B, . . . within a sliding window (W) of the range R, whose length ($\omega$) is variable and adaptive. As will be explained more precisely later, the window length co is variable and depends on a current range R (i.e., the current distance between the detection device 1 and the object 2) and a current estimate $\theta$ of the elevation angle. The generation of the spectrum of elevation angle $\theta$ by accumulating (for example: combining or integrating) the measurement information from the receiving antenna elements 11A, 11B, . . . within a range window whose length is variable and adaptive allows to eliminate the interference effects.

Figure 2:
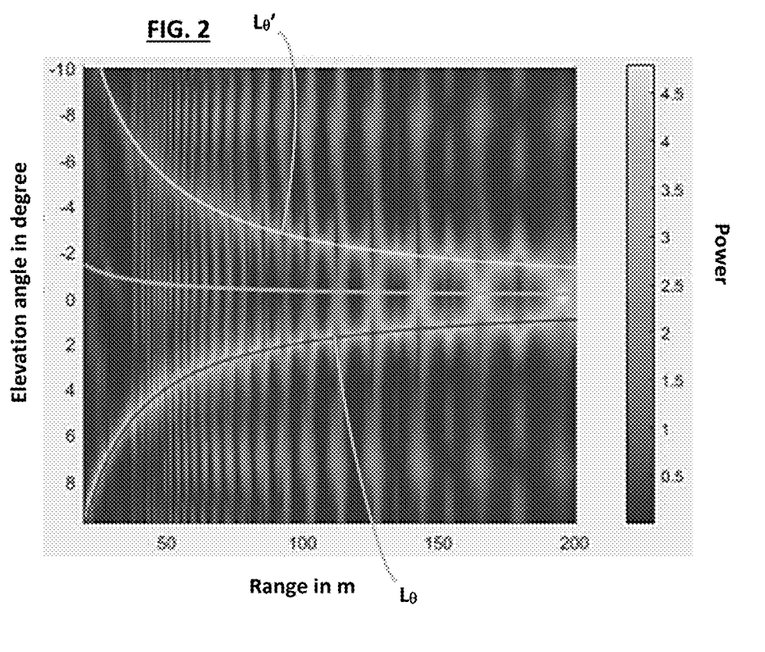
FIG. 2 shows a first estimation (disturbed) of a spectrum of elevation angle of the object over the object distance (range), based on instantaneous measured data.

FIG. 2 shows a spectrum of the estimated elevation angle $\theta$ over range R produced by using, one by one, the measurements performed by the receiver elements 11A, 11B, . . . , without accumulating the measurement information from multiple measurements. It is as if the spectrum of estimated elevation angle $\theta$ was generated using a window W whose length is fixed and very short. The lines $L_\theta$ and $L_\theta'$ shown in FIG. 2 are generated based on a geometrical relationship between the true height of the object 2, the height of the detection device 1 and the range R. $L_\theta'$ corresponds to the artificial object 2' below the road and $L_\theta$ corresponds to the real object 2. The middle line in FIG. 2 represents an object at the ground surface level and is only for reference purposes. The spectrum of the estimated elevation angle $\theta$ shows disturbances such as peaks of energy due to the interference phenomenon. It leads to an erroneous estimation of the elevation angle, in particular for far ranges (more than 100 m).

Figure 4:
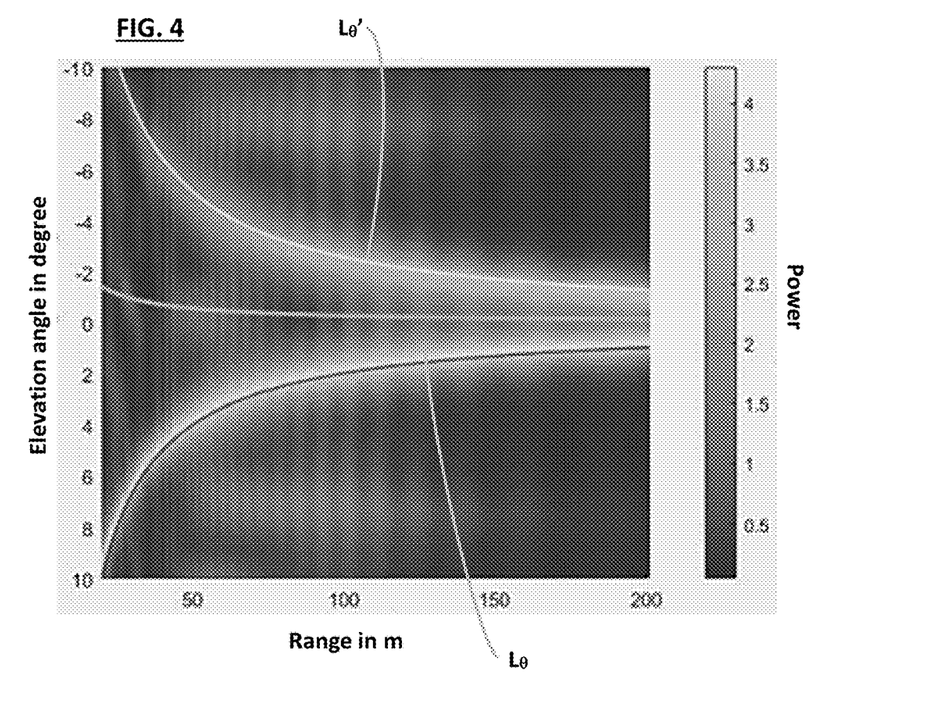
FIG. 4 shows a third estimation of the spectrum of elevation angle of the object over the object distance (range), based on measured data integrated or combined over a variable window length, according to an implementation.

The present disclosure allows to eliminate the disturbances shown in FIG. 2 and to produce a spectrum of estimated elevation angle as represented in FIG. 4, that follows the lines $L_\theta$ and $L_\theta'$ without peaks and/or valleys.

As shown in FIG. 5, the detection device 1 further has a transceiver block 12, to which the transmitting antenna element 10 and the receiving antenna elements 11A, 11B are connected, and a processor 13 (for example: a control processing unit).

The transceiver block 12 controls the transmission of waves by the transmitter element 10 and processes the waves received in return by the receiver elements 11A, 11B, . . . to extract a measurement information including an amplitude and phase information.

The processor 13 controls the operation of the detection device 1 and performs wave signal processing to estimate a height of an object or target. More precisely, the processor 13 controls the execution of the steps of the method for determining an information on the height of a target 2, described below.

Figure 6:
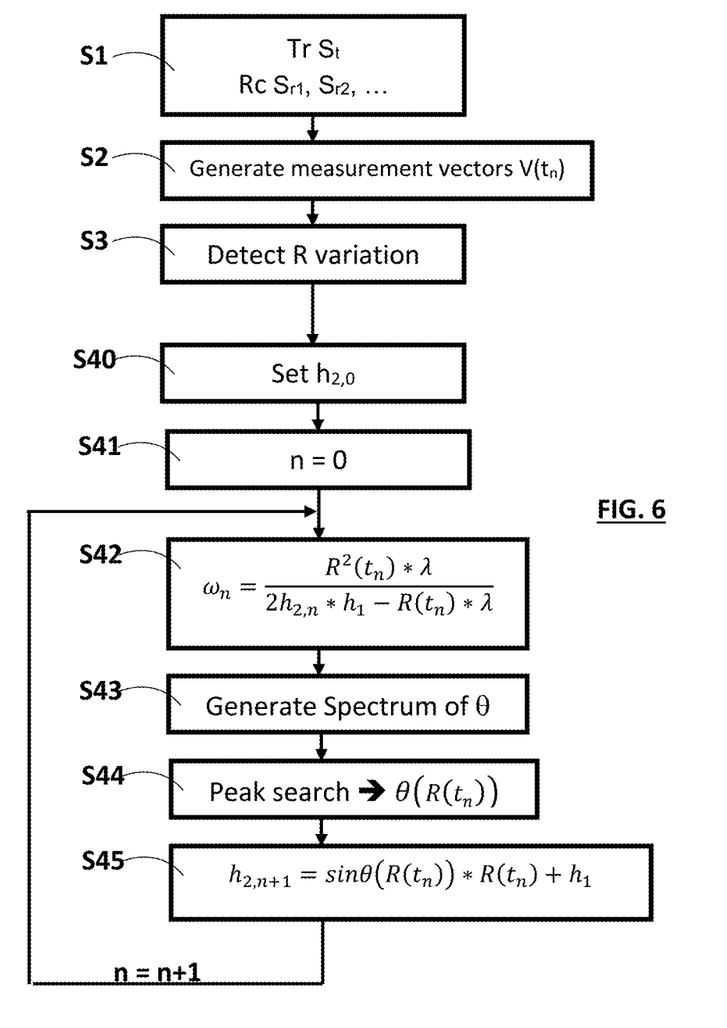
FIG. 6 shows a flowchart of the method for estimating a height of the target, according to an implementation.

The method for estimating the height of the object 2 above the reflecting surface 3, carried out by the detection device 1 under control of the processor, according to an implementation, will now be described with reference to FIGS. 4, 5 and 6.

In a step S1, the transmitter antenna element 10 transmits a radar wave signal St to the object or target 2. In return, the receiver antenna elements 11A, 11B, . . . receive radar wave signals Sr1, Sr2, . . . reflected by the object 2. As previously explained, the waves (for example: the wave signal) propagate via multiple paths due to the reflection by the reflecting surface 3, and an interference phenomenon occurs.

In a step S2, parallel to the step S1, the wave signals Sr1, Sr2 received by the plurality of receiver antenna elements 11A, 11B, . . . are measured at successive measurement points in time, for example with a given measurement frequency. For each measurement, the output of each receiver antenna element 11A, 11B, . . . is processed by the transceiver block 12 to determine a measurement information that includes an amplitude information and a phase information and can be modelled by a complex value. For each measurement point in time $t_n$, the measurement information from the plurality of receiver antenna elements 11A, 11B can be combined into a measurement vector $V(t_n)$, also termed as a "beam vector", of complex values. Each component of the vector $V(t_n)$ corresponds to the measurement information of one receiving antenna element 11A, 11B, . . . .

In a step S3, it is determined that the object distance or range R, that is the distance between the radar device 1 and the target 2, varies over time. For example, the range R decreases while the vehicle equipped with the radar device 1 is approaching the object 2.

In a step S4, while the range R varies, a spectrum of the estimated elevation angle θ of the object 2 over the range R is produced and the elevation angle estimate θ is updated.

In the present disclosure, an estimate of the elevation angle θ is performed by accumulating (for example: by combining or integrating) the measurement information from the plurality of receiver elements 11A, 11B, ... within a sliding range window W. In other words, the plurality of measurement vectors $V(t_n)$ generated within the window W are combined to estimate the elevation angle θ. Different methods of combination are known. For example, the measurement vectors can be combined by calculating an average, or a standard deviation, or a variability. For example, the measurement vectors can be combined by calculating an average, or a standard deviation, or a variability. The window length is variable and adaptive, as explained below.

The step S4 includes different steps S40 to S45 and is an iterative process.

In a preliminary step S40, an initial estimate of the height $h_{2,0}$ of the object 2 is automatically set. If the detection device 1 is dedicated to the detection of big objects, like bridges, the initial height can be selected between 2 and 4 meters. If the detection device 1 is dedicated to the detection of small objects, like sidewalks, the initial height can be selected between 0.1 and 1 meter. If the detection device is designed for detecting all types of objects, the initial height can be selected between 0.5 and 2 meters. However, any initial value of the height can be selected. It is only a starting value that is quickly and iteratively updated to converge towards a true height of the object 2, as explained below.

In another implementation, an initial window length ωo is set, instead of setting an initial object height $h_{2,0}$.

In an initial step S41, an iteration index n is set to 0 and the iterative process of estimating the height $h_2$ of the object 2 is started. The iterative process includes the following steps S42 to S45, that are performed for the successive values of n, with n=0, 1, 2, 3, ....

In the step S42, at time point $t_n$, a window length $\omega_n$ is calculated and derived from a current estimate of the height $h_{2,n}$, using the following expression:

$$\omega_n = \frac{R^2(t_n)*\lambda}{2h_{2,n}*h_1 - R(t_n)*\lambda} \quad (2)$$

where
$\omega_n$ is the current window length at point $t_n$ in time;
$R(t_n)$ is the range at point $t_n$ in time;
λ is the wavelength;
$h_{2,n}$ is the current estimate of the height of the object at point $t_n$ in time;
$h_1$ is the height of the detection device 1.

A phase difference of the wave signals between the direct path and the indirect path varies as the range R varies. A full phase cycle is completed when said phase difference covers 360°. In the present disclosure, the length $\omega_n$ of the sliding range window W is variable and adaptive. For a given point in time tn, the window length $\omega_n$ is determined by estimating how much the range R varies over a full phase cycle of the phase difference between the direct and indirect paths from a current value of the range $R(t_n)$ and a current estimate $h_{2,n}$ of the height of the object 2.

The range difference over a full phase cycle is taken as the window length ωo and can be expressed as follows:

$$\omega = R_{CC} - R \quad (3)$$

where $$R = \frac{4h_2 h_1}{\lambda * 2m}$$

is the object distance (between the detection device 1 and the object 2) at the start of a phase cycle;

$$R_{CC} = \frac{4h_2 h_1}{\lambda * 2(m-1)}$$

is the object distance at the end of the phase cycle.

Alternatively, based on the above expressions, at any time, the range difference ω over a full phase cycle can be expressed as follows:

$$\omega = \frac{z}{2(m-1)} - \frac{z}{2m} \text{ where } z = \frac{4h_2 h_1}{\lambda} \text{(by definition).} \quad (4)$$

Therefore, by combining the expression of R $$\left(R = \frac{4h_2 h_1}{\lambda * 2m}\right)$$

and the expression of z $$\left(z = \frac{4h_2 h_1}{\lambda}\right),$$

the range R can be expressed as follows:

$$R = \frac{z}{2m}$$

and therefore $$m = \frac{z}{2R}.$$

By replacing m by $$\frac{z}{2R}$$

in the expression (4), the range difference over a full phase cycle, taken as the window length ω, can be expressed as follows:

$$\omega = \frac{z}{2\left(\frac{z}{2R}-1\right)} - \frac{z}{2\frac{z}{2R}} = \frac{2R^2}{z-2R} = \frac{R^2 \lambda}{h_2 * h_1 - R*\lambda},$$

which corresponds to the expression (2) used in the step S41 to calculate the window length ω from the current range R and a current estimate of the object height h2.

In a step S43, a spectrum of the estimated elevation angle θ of the object 2 over the range R is created (produced) by combining (for example: by integrating, or by accumulating) a plurality of measurement vectors over the range window W of length $\omega_n$. In other words, at time point $t_n$, the measurement vectors of complex values determined at successive measurement points that include the time point $t_n$ and preceding time points $t_{n-1}$, $t_{n-2}$, . . . within the window W of length $\omega_n$ (ending at time point $t_n$) are combined to generate the spectrum of the estimated elevation angle. Different methods for combining the vectors can be used, as previously explained.

Then, in a step S44, an estimate of the elevation angle θ is derived from the generated spectrum of the estimated elevation angle θ for the range $R(t_n)$ at time point tn. A peak search can be performed in the generated spectrum at the range $R(t_n)$ to pick the elevation angle with the highest energy.

Then, in a step S45, the height of the object 2 is estimated from the elevation angle θ that was picked in the step S44. The updated estimate of the object height is referenced as $h_{2,n+1}$ and is calculated using the expression:

$$h_{2,n+1} = \sin\theta(R(t_n))*R(t_n)+h_1$$

where
$R(t_n)$ is the range at point in time $(t_n)$;
$h_1$ is the height of the detection device (1);
$\theta(R(t_n))$ is an estimated elevation angle derived from the spectrum of elevation angle for the range $R(t_n)$ (for example, the elevation angle with the highest energy picked in the spectrum).

Then, the steps S42 to S45 are repeated for the next index n+1.

The iterative process including the steps S42 to S45 can be executed for each measurement of the wave signals by the detection device 1.

Thus, the height $h_2$ of the object 2 is iteratively updated and improved along with the window length w. The process of refining the window length ω and, concomitantly, optimizing the estimate of the object height h2 continues over range and over successive measurements. It can be stopped at any time when the estimation of the object height is considered as sufficiently accurate.

The present approach uses multiple measurements for height estimation. The wave signals are directly used and measured. The measurements are carefully selected by a window whose length is estimated in an adaptive manner over time.

The present method for estimating a height of an object can be applied in various situations of multipath propagation of waves. It is not limited to a multipath situation caused by reflection on a road, but also applies to other multipath situations caused by reflection on a side wall, on a guard-rail, or any other reflecting surface. The multipath propagation can be vertical or horizontal.

FIG. 4 represents the spectrum of estimated elevation angle generated by using the iterative process described above. The lines $L_\theta$ and $L_\theta'$ shown in FIG. 4 are generated based on the geometrical relationship between the true height of the object 2, the height of the detection device 1 and the range R. $L_\theta'$ corresponds to the artificial object 2' below the road and $L_\theta$ corresponds to the real object 2. The middle line in FIG. 4 represents an object at the ground surface level and is only for reference purposes. The spectrum of the estimated elevation angle θ follows perfectly the theoretical lines $L_\theta$ and $L_\theta'$ and shows no disturbance due to the interference effects of the multipath wave propagation. The use of an adaptive sliding window and the iterative process of determining the window length ω and estimating the object height allow to eliminate the interference effects in the spectrum of the estimated elevation angle θ.

Figure 3:
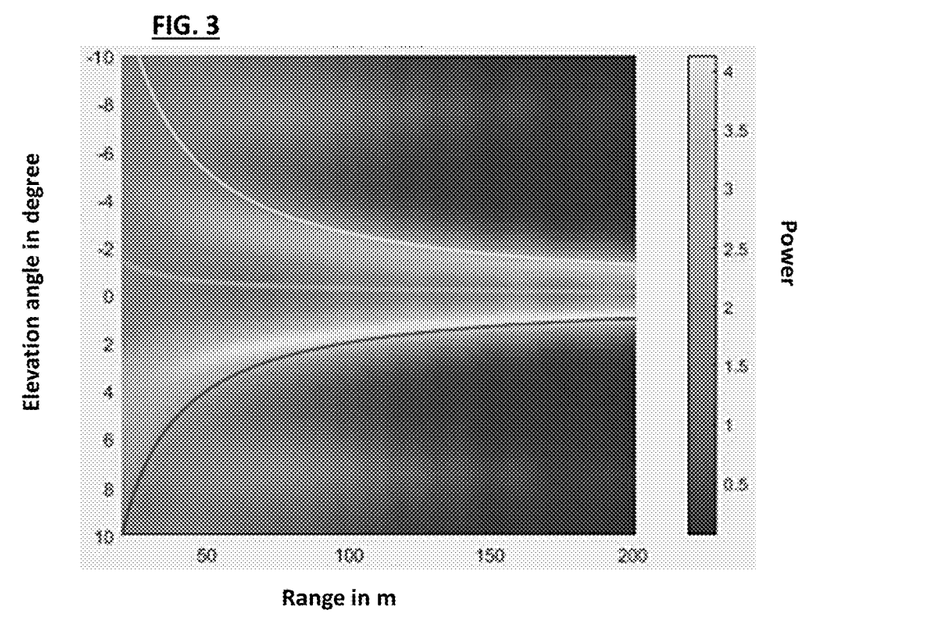
FIG. 3 shows a second estimation of the spectrum of elevation angle of the object over the object distance (range), based on measured data integrated or combined over a fixed window length that is too long.

FIG. 3 shows an example of a spectrum of estimated elevation angle produced by using a window whose length is fixed and too long. In that case, the produced spectrum of elevation angle leads to an erroneous estimation of the elevation angle, in particular for close ranges (less than 100 m).

The detection device 1 has software means and hardware means to implement the method of estimating the height of a target or object 2, as previously described. The present disclosure also concerns a computer program including instructions to cause the processor 13 of the detection device 1 to execute the steps of the method described, and a computer-readable medium having stored there on the computer program.

What is claimed is:

1. A method for estimating a height of an object, carried out by a detection device that transmits signals and receives, by a plurality of receiver antenna elements, signals reflected by the object, the signals propagating via a direct path between the object and the detection device and an indirect path between the object and the detection device via reflection over a reflecting surface, the method comprising:
   measuring reflected signals received by the plurality of receiver antenna elements of the detection device at successive measurement points in time $(t_n)$;
   generating, for each measurement point in time $(t_n)$, a measurement vector $(V(t_n))$ of complex values, wherein each component of the measurement vector $V(t_n)$ corresponds to measurement information of one receiving antenna element;
   producing, while a range (R) between the detection device and the object varies over time and at each measurement point in time $(t_n)$ that corresponds to one range $(R(t_n))$, a spectrum of elevation angle (θ) with respect to the range (R) by combining a plurality of measurement vectors over a sliding range window (W), the spectrum indicative of energy of received signals reflected by the object across multiple elevations and ranges; and
   for each measurement point in time $(t_n)$, estimating a current height $(h_2)$ of the object using a given elevation angle (θ), the given elevation angle (θ) selected from the spectrum based on an indication of peak energy, wherein a length of the sliding range window (W) is variable and determined by estimating a range interval covered by a full phase cycle of a phase difference between the direct path and the indirect path, from a current value of the range $R(t_n)$, and an estimated current height $(h_2)$ of the object, and wherein (i) determining a window length (ω), (ii) producing the spectrum, and (iii) estimating the current height $(h_2)$ of the object are performed iteratively at the successive measurement points in time.

2. The method according to claim 1, wherein a variable window length $(\omega_n)$ at a point in time $(t_n)$ is computed using an expression:

$$\omega_n = \frac{R^2(t_n)*\lambda}{2h_{2,n}*h_1 - R(t_n)*\lambda}$$

where
$\omega_n$ is a current window length at point in time $(t_n)$;
$R(t_n)$ is a range at point in time $(t_n)$;
λ is a wavelength;

$h_{2,n}$ is the estimated current height of the object at point in time ($t_n$); and $h_1$ is a height of the detection device.

3. The method according to claim 1, wherein the estimated current height of the object is updated using an expression:

$$h_{2,n+1} = \sin \theta(R(t_n)) \cdot R(t_n) + h_1$$

where $h_{2,n+1}$ is an updated value of the estimated current height of the object;

$R(t_n)$ is a range at point in time ($t_n$);

$h_1$ is a height of the detection device; and $\theta(R(t_n))$ is an elevation angle ($\theta$) derived from the spectrum for a range $R(t_n)$.

4. The method according to claim 3, wherein the elevation angle $\theta(R(t_n))$ is derived from the spectrum by performing a peak search to determine a given elevation angle ($\theta$) having a highest energy value in the spectrum for the range $R(t_n)$.

5. The method according to claim 1, further comprising setting at least one of an initial height of the object or an initial window length.

6. The method according to claim 1, wherein a transmitter element transmits radar signals to be reflected by the object.

7. The method according to claim 1, wherein the spectrum is produced while the range (R) between the detection device and the object is decreasing.

8. A detection device comprising:

a transmitting part for transmitting signals to be reflected by an object;

a receiving part having a plurality of receiver antenna elements for receiving signals reflected by the object, the signals propagating via a direct path between the object and the detection device and an indirect path between the object and the detection device via reflection over a reflecting surface; and a processor for controlling an execution of:

measuring reflected signals received by the plurality of receiver antenna elements of the detection device, at successive measurement points in time ($t_n$);

generating, for each measurement point in time $t_n$, a measurement vector ($V(t_n)$) of complex values, wherein each component of the measurement vector ($V(t_n)$) corresponds to measurement information of one receiving antenna element;

producing, while a range (R) between the detection device and the object varies over time at each measurement point in time $t_n$ that corresponds to one range ($R(t_n)$), a spectrum of elevation angle ($\theta$) with respect of the range (R) by combining a plurality of measurement vectors over a sliding range window (W), the spectrum indicative of energy of received signals reflected by the object across multiple elevations and ranges; and for each measurement point in time ($t_n$), estimating a current height ($h_2$) of the object using a given elevation angle ($\theta$), the given elevation angle ($\theta$) selected from the spectrum based on an indication of peak energy, wherein a length of the sliding range window (W) is variable and determined by estimating a range interval covered by a full phase cycle of a phase difference between the direct path and the indirect path, from a current value of the range $R(t_n)$, and an estimated current height ($h_2$) of the object, and wherein (i) determining a window length ($\omega$), (ii) producing the spectrum, and (iii) estimating the current height ($h_2$) of the object are performed iteratively at the successive measurement points in time.

9. A non-transitory computer-readable storage medium storing one or more programs, the one or more programs comprising instructions, which when executed by a detection device, cause the detection device to:

measure reflected signals received by a plurality of receiver antenna elements of the detection device, at successive measurement points in time ($t_n$);

generating, for each measurement point in time $t_n$, a measurement vector ($V(t_n)$) of complex values, wherein each component of the measurement vector $V(t_n)$ corresponds to measurement information of one receiving antenna element;

producing, while a range (R) between the detection device and an object varies over time and at each measurement point in time ($t_n$) that that corresponds to one range ($R(t_n)$), a spectrum of elevation angle ($\theta$) with respect to the range (R) by combining a plurality of measurement vectors over a sliding range window (W), the spectrum indicative of energy of received signals reflected by the object across multiple elevations and ranges; and for each measurement point in time ($t_n$), estimating a current height ($h_2$) of the object using a given elevation angle ($\theta$), the given elevation angle ($\theta$) selected from the spectrum based on an indication of peak energy, wherein a length of the sliding range window (W) is variable and determined by estimating a range interval covered by a full phase cycle of a phase difference between a direct path and an indirect path, from a current value of the range $R(t_n)$, and an estimated current height ($h_2$) of the object, and wherein (i) determining a window length ($\omega$), (ii) producing the spectrum, and (iii) estimating the current height ($h_2$) of the object are performed iteratively at the successive measurement points in time.

* * * * *